United States Patent [19]

Edington

[11] Patent Number: 4,953,657

[45] Date of Patent: Sep. 4, 1990

[54] TIME DELAY SOURCE CODING

[75] Inventor: Bruce L. Edington, Houston, Tex.

[73] Assignee: Halliburton Geophysical Services, Inc., Houston, Tex.

[21] Appl. No.: 312,360

[22] Filed: Feb. 14, 1989

Related U.S. Application Data

[63] Continuation of Ser. No. 126,346, Nov. 30, 1987, abandoned.

[51] Int. Cl.$^5$ ............................................. G01V 1/00
[52] U.S. Cl. ...................................... 181/111; 367/50
[58] Field of Search .................. 181/111; 367/50, 55, 367/47

[56] References Cited

U.S. PATENT DOCUMENTS

| | | | |
|---|---|---|---|
| 3,956,730 | 5/1976 | Barbier | 367/37 |
| 3,984,805 | 10/1976 | Silverman | 367/190 |
| 4,159,463 | 6/1979 | Silverman | 367/59 |
| 4,170,002 | 10/1979 | Strange | 181/111 |
| 4,242,740 | 12/1980 | Ruehle | 367/36 |
| 4,467,459 | 8/1984 | Currie | 367/23 |
| 4,715,020 | 12/1987 | Landrum, Jr. | 367/38 |

Primary Examiner—Thomas H. Tarcza
Assistant Examiner—Ian J. Lobo
Attorney, Agent, or Firm—Andrew J. Dillon

[57] ABSTRACT

In seismic exploration, a survey may be conducted using multiple seismic energy sources activated substantially simultaneously. A series of shots is made at each shot point, with a determinable time delay between the activation of each source for each shot. There must be at least two different determinable time delays in each series of shots. The seismic signals are recorded. A method of processing the signals to separate signals from each source is provided. For each signal receiver, the amplitudes of the signals from each shot in the series is summed. The signals are then time shifted, so that the signals from the second source to be activated are received at the same time, and the amplitudes for the series are summed. This step is repeated for each subsequently activated source. Time domain operators are derived, the operators and the summations Fourier transformed to the frequency domain, in which the signals received from each source are readily calculated. The separated signals may then be inverse Fourier transformed to the time domain.

10 Claims, 2 Drawing Sheets

TIME DELAY SOURCE CODING

This application is a continuation of application Ser. No. 126,346, filed 11/30/87, now abandoned.

BACKGROUND OF THE INVENTION

The present invention relates to a method of separating for analysis seismic signals received from multiple seismic sources which are activated substantially simultaneously.

A common seismic survey method employs a single seismic source in conjunction with multiple geophone detector arrays arranged equally spaced along a line from the source. A number of shots are made, in order to improve the signal to noise ratio, and then the source and detector arrays are moved along the same line a short distance and the shooting procedure repeated. This procedure is repeated along the predetermined length of the survey line and other designated survey lines in the area to be surveyed. The recorded data from each shot is then processed, usually by a digital computer at a headquarters processing department.

When only one seismic source is used, the survey procedure can be very time-consuming. With modern signal processing methods, the most expensive part of the seismic survey process has become the field survey period. This period could be shortened if more than one seismic source could be used simultaneously. However, multiple sources can only be used if some means for distinguishing between signals emanating from the different sources can be provided.

U.S. Pat. No. 3,885,225 to Anstey et al proposes a method to distinguish between multiple sources. This involves a frequency segmentation technique, applied to use of a pulse-compression system of seismic prospecting (generally referred to in the art by the trademark "Vibroseis"). Vibroseis involves the use of vibrators emitting long, swept-frequency signals in the seismic frequency range, the detection of emitted signals after reflection and refraction within the earth by detectors located on the earth's surface in the survey area, and the cross correlation of the detected signals against the emitted signals. Anstey et al is directed to a method and apparatus for broad-line seismic profiling, using several vibrators simultaneously emitting signals. The normal emission frequency bandwidth is divided into several parts which are allocated to individual vibrators in a sequence of separate emissions, in such a way that mutually exclusive frequencies are radiated by the several vibrators at any one time. The detected signals are separated on the basis of frequency to represent the individual signals from each vibrator. Apart from the fact that this technique is limited to one method of seismic surveying, Vibroseis, the frequency limitation on each individual vibrator reduces sensitivity. Further, the '225 patent admits that harmonic distortion in the vibrators or their coupling with the ground can impair the capacity of the correlation process to separate the signals from different generators.

SUMMARY OF THE INVENTION

In accordance with the present invention there is provided a method of obtaining seismic data for a geophysical survey in which two or more seismic energy sources are activated substantially simultaneously for each shot, and a method of processing the data obtained in the survey so as to separate out the signals received from each seismic energy source.

In particular, the method of obtaining the seismic data for a geophysical survey comprises shooting at least two seismic energy sources substantially simultaneously with a determinable time delay between the activation of each source, shooting the sources at least a second time substantially simultaneously with a different determinable time delay between the activation of each source from the determinable time delay used in at least one previous shooting and, for each shooting, recording as a function of time the amplitude of the seismic signals must be received at at least one point in the survey area spaced apart from the seismic energy sources.

In one embodiment, the seismic energy sources used are surface types of energy source. Preferably, at least one of the determinable time delays is preselected, and is selected so that the difference in time delay between any two shootings enables the signal received from the first activated source to be distinguished from the signal received from the second activated source. Preferably, the difference in time delay between any two shootings is selected to be not equal to an integral multiple of the period of a frequency component the seismic signals, most preferably being not less than about one-quarter and not more than about three-quarters of such period.

In the preferred embodiment, the amplitude of the size of the signals is recorded in digital form.

There is also provided a method of obtaining seismic data for a geophysical survey which comprises shooting at least two seismic energy sources substantially simultaneously with a determinable time delay between the activation of each source, shooting the sources at least a second time substantially simultaneously with a different determinable time delay between the activation of each source from the determinable time delay used in at least one previous shooting, for each shooting recording as a function of time the amplitude of the seismic signals received at at least one point in the survey area spaced apart from the seismic energy sources and analyzing the recorded seismic signals to separate signals originating from each seismic source.

In the preferred embodiment, the seismic energy source is a surface energy source, and at least one of the determinable time delays is preselected. Preferably, the difference in time delay between any two shootings is selected so as to enable the signal received from the first activated source to be distinguished from the signal received from the second activated source, preferably not being equal to an integral multiple of the period of a frequency component of the seismic signals. Most preferably, the difference in time delay between any two shootings is selected to be not less than about one-quarter and not more than about three-quarters of the period of a frequency component of the seismic signals.

In one embodiment, the amplitude of the seismic signals is recorded in digital form.

In the preferred embodiment, the recorded signals are analyzed by a method comprising summing the amplitude of the seismic signals from each shooting as a function of time for each point for which received seismic signals are recorded, then time shifting the seismic signals from each shooting so that the signal received from the second source to be activated is received at the same time for each shooting and then summing the amplitude of the time shifted seismic signals as a function of time. This time shifting step is repeated for each subsequently activated source, and for each summation derived from the above steps, and an appropriate time domain operator is derived from the determinable time delays. The Fourier transform to the frequency domain of each time domain operator and to the frequency domain of each summation are then derived, the signals received from each energy source in the frequency domain for each frequency are calculated and the inverse Fourier transform to the time domain of the signals received from each energy source is derived.

The present invention also provides a method of analyzing seismic signals from two or more shootings of at least two seismic energy sources activated substantially simultaneously with a determinable delay between the activation of each source so as to separate the signals originating from each seismic source. This method comprises, for each point for which received seismic signals are recorded, summing the amplitudes of the seismic signals from each shooting as a function of time and time shifting the seismic signals from each shooting so that the signal received from the second source to be activated is received at the same time for each shooting, then summing the amplitudes of the time shifted seismic signals as a function of time. The time shifting step is repeated for each subsequently activated source. An appropriate time domain operator is derived from the determinable delays for each summation derived from the above steps, and the Fourier transform to the frequency domain of each such time domain operator and of each summation is derived. The signals received from each energy source in the frequency domain for each frequency are calculated, and then the inverse Fourier transform to the time domain of the signals received from each energy source is derived.

DETAILED DESCRIPTION

Figure 1:
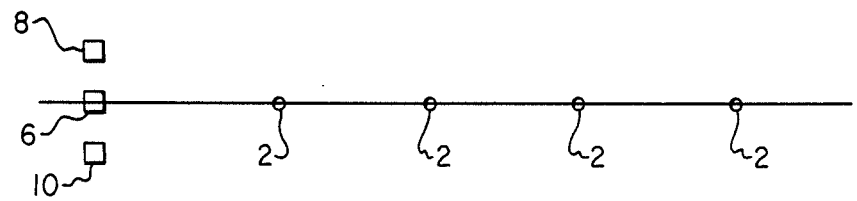
FIG. 1 illustrates a field layout for a seismic survey according to the present invention.

One application for which the present invention is particularly useful is three dimensional seismic surveying. A field layout for this type of survey is shown schematically in FIG. 1. Seismic detectors 2 are spaced along a survey line 4. These detectors are preferably clusters of geophones. Energy source 6 is located on the survey line 4 at a distance from the nearest detector 2, and seismic energy sources 8, 10 of the same type as source 6, are located on either side of line 4, spaced apart from the line.

Figure 2:
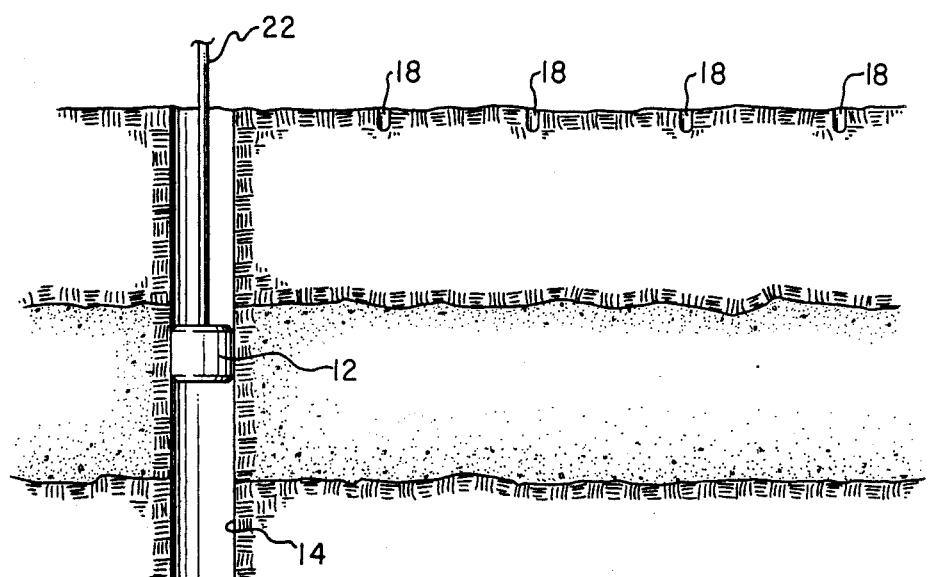
FIG. 2 illustrates vertical seismic profiling.

Another useful application for the present invention is vertical seismic profiling, shown schematically in FIG. 2. A tool 12 containing geophones is located in well bore 14, in contact with the geological stratum 16. Seismic energy sources 18 are located at the surface 20. Signals from the geophones are transmitted to the surface through leads 22.

Figure 3:
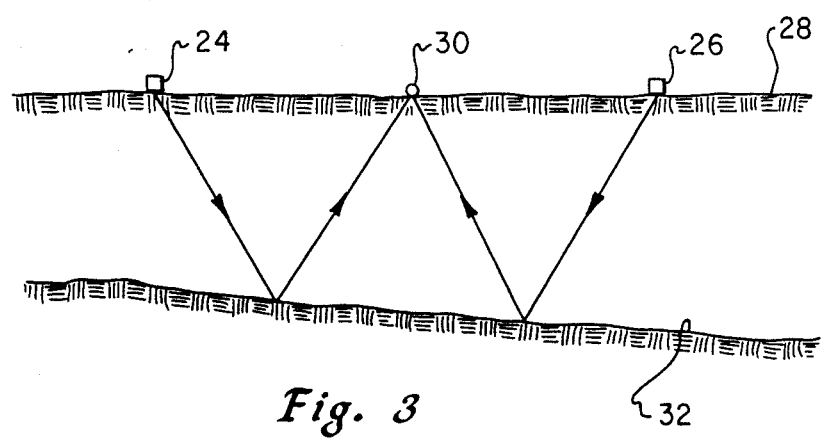
FIG. 3 illustrates a typical path for seismic waves in a survey as shown in FIG. 1.

For purposes of simplification, the method of the present invention will be described for two seismic energy sources, but those skilled in the art will readily recognize that the method can be used with multiple sources. Referring to FIG. 3, two seismic energy sources, 24 and 26 are shown, located on the earth's surface 28. For simplicity, a single detector 30 is shown, but it will be readily understood that this can be replaced by a geophone group conventional in the art. In FIG. 3 the reflection paths of seismic waves originating from energy sources 24 and 26 and reflected off geological stratum 32 after passage through a homogenous layer bounded by the surface 28 and stratum 32 to detector 30 are shown.

Seismic energy sources 24 and 26 are preferably surface energy sources, such as weight drop or Vibroseis, well known in the art. In the preferred embodiment, activation of sources 24 and 26 is controlled by a computer in the survey control truck by way of radio signals or by cable.

It is conventional to perform a number of shots at each shotpoint in order to build up the signal-to-ambient noise ratio. Preferably, the seismic sources are in the same position for each of these shots. The decision as to how any shots at each shotpoint depends on the circumstances, and is readily made by persons of ordinary skill in the art. The present invention can be used with two or more shots, but for the purposes of this description it will be assumed that eight shots are made at each shotpoint.

In the method of the present invention, seismic energy sources 24 and 26 are activated with a short time delay between the activation of 24 and of 26. This time delay must be measured and recorded, which may be done by any conventional means.

Preferably, seismic energy sources 24 and 26 are activated at certain variable times relative to time zero on the recording system. The activation time relative to time zero of the recorder may be repeated at a specified shot point from shot to shot for either source. However, for each shot point there must be some variation in the activation time delay between sources 24 and 26 for different shots, and this delay is preferably different for each shot made at one shot point.

In the preferred embodiment, the times of activation of the sources are predetermined, and the sources operate with sufficient accuracy to allow these predetermined times to be used in the separation calculations made according to the method of the present invention. However, for sources which exhibit considerable random variation in operation from the selected activation time, the true time of activation should be measured and recorded to improve the accuracy of the separation process.

In order to satisfactorily detect the difference between the signals from sources 24 and 26 at the detector 30 for each frequency in the desired seismic frequency band, for any two shots in the series the relative activation time delays should differ by a non-integral fraction of the period of that frequency. It is most preferred that this difference should be between one quarter and three quarters of the period of the frequency concerned. However, the actual fraction of the period needed to compute the signal separation to the required accuracy for a particular frequency is a function of the signal to noise ratio, and determining the optimum difference in activation time delays for each pair of shots may readily be performed by a person of ordinary skill in the art.

The seismic signals from the two sources 24 and 26 are received by detector 30 and transmitted to a storage means. This storage means may be a recorder of a conventional type, which may be either analog or digital or it may be any kind of data storage used in conjunction with a computer. In the preferred embodiment, a digital recording system is employed, with a two millisecond digital sampling period. The signal received by detector 30 is shown schematically as the trace 34 which is numbered "1" in FIG. 4. Blip 36 corresponds to the signal from the first activated source 24, while blip 38 corresponds to that from source 26. For the purposes of simplifying this description it is assumed that these signals are received after passage through a homogenous layer bounded by 28 and 32 and after reflection from a feature 32 parallel to the surface 28 and that detector 30 is spaced equidistant from sources 24 and 26, so that the time delay between blips 36 and 38 is equal to the activation delay between sources 24 and 26. However, the invention is applicable to any type of subsurface structure and any placement of the detectors relative to the sources.

For the second shot of the series, the time delay between the activation of the first and second sources must differ from the activation delay of the first shot, and must also be measured and recorded. It is preferred that this time delay be predetermined, and that it be greater than the first activation delay by a determinable increment. This process is repeated for each of the shots in the series, with a different measured time delay for each shot. Preferably, the time delay between the activation of the first and second sources is increased for each subsequent shot by a constant amount, k, so that the time delay $t_n$ for the nth shot is given by the formula $$t_n = t_o + (n-1)k$$

where $t_o$ is the activation time measured relative to the start of the recorder for the second source on the first shot.

It will be observed that, in this preferred embodiment, when the traces for each shot are aligned with blips 36 on straight horizontal line 40, the blips 38 plotted with respect to time lie on a straight line 42 which is at an angle to line 40.

In general, this procedure is repeated at multiple locations in the survey area. In the preferred embodiment, the analysis of the data gathered by the above procedure is performed after all the data has been obtained, but the method of the present invention may also be used to analyze the data as it is gathered.

The first step in analyzing the data is to sum the traces in the series. This summation may be expressed by the equation $$N\chi_i + \sum_{P=1}^{N} Y_{i-(P-1)k} = N\hat{\chi}_i^* \tag{1}$$

where N is the total number of shots in the series, $\chi_i$ are the individual signals 36 from energy source 24 and $Y_i$ (P-1)K are the individual signals 38 from energy source 26.

Figure 4:
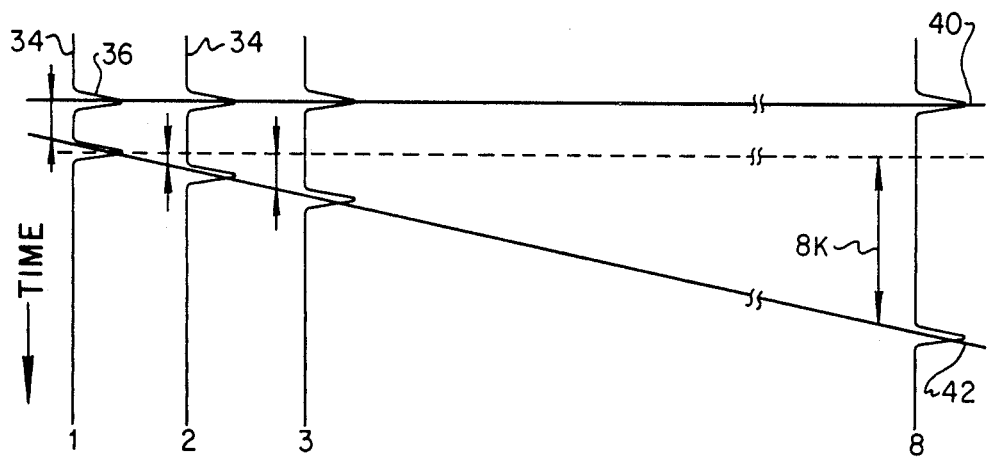
FIG. 4 shows schematically signals received by a detector from a series of seismic source shootings according to the present invention.
Figure 5:
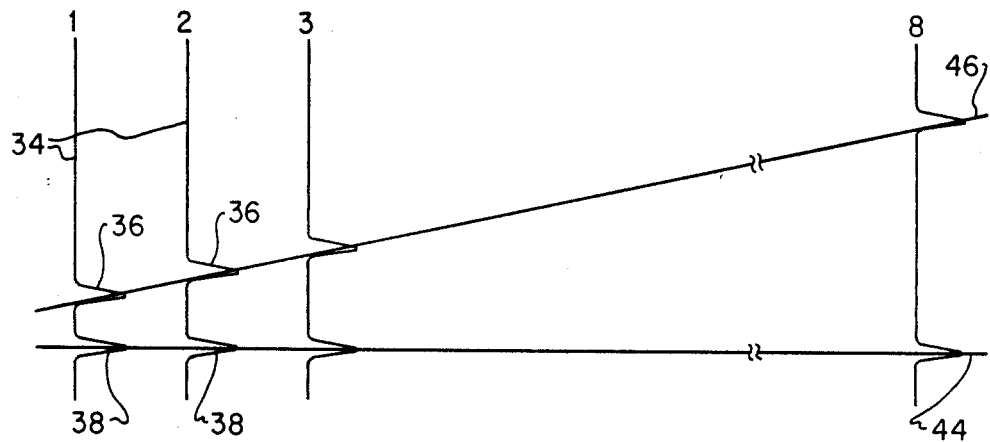
FIG. 5 shows the effect of time-shifting the signals of FIG. 4 according to the method of the present invention.

The signals shown in FIG. 4. are then time shifted as shown in FIG. 5. so that the signals 38 are aligned on straight line 44 and signals 36 are on sloping line 46, and the time shifted signals are summed. This summation may be represented by the equation $$NY_i + \sum_{P=1}^{N} X_{i+(P-1)k} = N\hat{Y}_i^* \tag{2}$$

Appropriate operators H and K are derived from the time delays in summation (1) and (2) respectively, an operation well known to those of ordinary skill in the art of operational mathematics and Fourier analysis. H and K are such that $$N\chi_1 + H^* Y_i = N\hat{\chi}_i^o \tag{3}$$

$$K^*\chi_i + NY_i = N\hat{Y}_i^o \tag{4}$$

Where * represents convolution.

The Fourier transform to the frequency domain of equation (3) and (4) yields $$NF(\{\chi_i\}) + MF(H) \cdot F(\{Y_i\}) = NF(\{\hat{\chi}_i^o\}) \tag{5}$$

$$MF(K) \cdot F(\{\chi_i\}) + NF\{Y_i\}) = NF(\{\hat{Y}_i^o\}) \tag{6}$$

where F represents the Fourier transform and M is the dimension of the Fourier transform.

These two equations may be solved for the two unknowns $F(\{\chi_i\})$ and $F(\{Y_i\})$ for each frequency, which are then inverse Fourier transformed to the time domain.

It will be obvious to those skilled in the art that these equations cannot be solved if any determinant on the left hand side is equal to zero, so the time delays should preferably be selected so that no determinant is equal to zero. In practice, it is generally possible to select the time delays in such a manner that all the determinants are non-zero for frequencies within the frequency band of most interest in seismic surveys. However, it may be necessary or desirable under certain conditions to allow some singularities within this seismic frequency band, for example, in order to reduce the number of shots needed at each shot point.

These singularities, whether within or outside the seismic frequency band, can be handled by known methods used in geophysical analysis for stabilization of inverse operators. Preferably, a "white noise" method is used. Essentially, in this method a matrix which is singular or close to singular is replaced by a matrix closer to the identity matrix by increasing the size of the elements on the main diagonal by adding a constant factor. In practice, it is preferred to produce an equivalent result by instead dividing each of the elements not on the main diagonal by 1 +c, where c is a small positive constant quantity. For frequencies outside the seismic frequency band, the application of a bandpass filter may also be used to prevent the buildup of noise by the separation process. Another method is to set a minimum absolute value for the determinant. When the determinant has a value smaller than the minimum absolute value, the actual value is replaced by this minimum value with the proper sign attached. This method is suitable for frequencies outside the seismic frequency band.

The above analysis may be carried out by any conventional method, although it is preferred to use a programmed digital computer. Programs for performing the summations, time-shifting and Fourier transforms may be readily obtained or prepared by those of ordinary skill in the art of computer programming.

The signals from the individual energy sources, once separated by the above method of analysis, may then be used in conventional methods of obtaining geophysical information from seismic data.

It is an advantage of the present invention that the field survey time can be substantially shorter using multiple shots fired substantially simultaneously than with the conventional single shots, and this produces concomitant cost savings. In the case of vertical seismic profiling, normal well operations can often be interrupted for only a limited time, making it important to complete the survey process as quickly as possible, so the present invention is particularly advantageous.

Additional advantages and modifications will be readily apparent to those skilled in the art. The invention in its broader aspects is therefore not limited to the specific details, representative apparatus or the illustrative example shown and described. Accordingly, departures may be made from the detail without departing from the spirit or scope of the disclosed general inventive concept.

What is claimed is:

1. A method of obtaining seismic data for a geophysical survey, said method comprising the steps of:
    activating a first seismic energy source having a selected frequency component;
    receiving seismic signals from said first seismic energy source at at least one point within said geophysical survey;
    activating a second seismic energy source after a first selected time delay from activation of said first seismic energy source and while said seismic signals from said first seismic energy source are being received, said first selected time delay being a non-integral multiple of the period of said selected frequency component;
    receiving seismic signals from said second seismic energy source at said at least one point within said geophysical survey;
    activating said first seismic energy source a second time;
    receiving seismic signals from said second activation of said first seismic energy source at said at least one point within said geophysical survey;
    activating said second seismic energy source after a second selected time delay from said second activation of said first seismic energy source and while said seismic signals from said second activation of said first seismic energy source are being received;
    recording, as a function of time, the amplitudes of the seismic signals received at said at least one point within said geophysical survey for each activation of said first and second seismic energy source; and
    analyzing said recorded seismic signal amplitudes utilizing said selected time delays in order to separate signals originating from each of said seismic energy sources.

2. A method of obtaining seismic data for a geophysical survey according to claim 1 wherein said first and second seismic energy sources are surface energy sources.

3. A method of obtaining seismic data for geophysical survey according to claim 1 wherein said second selected time delay comprises a non-integral multiple of the period of said selected frequency component.

4. A method of obtaining seismic data for geophysical survey according to claim 1 wherein said first selected time delay comprises not less than one-quarter and not more that three-quarters of the period of said selected frequency component.

5. A method of obtaining seismic data for geophysical survey according to claim 1 wherein the step of recording the amplitudes of the seismic signals received at said at least one point within said geophysical survey comprises digitally recording said amplitudes.

6. A method of obtaining seismic data for a geophysical survey, said method comprising the steps of:
    activating a first seismic energy source having a selected frequency component;
    receiving seismic signals from said first seismic energy source at at least one point within said geophysical survey;
    activating a second seismic energy source after a first selected time delay from activation of said first seismic energy source and while said seismic signals from said first seismic energy source are being received, said first selected time delay being a non-integral multiple of the period of said selected frequency component;
    receiving seismic signals from said second seismic energy source at said at least one point within said geophysical survey;
    activating said first seismic energy source a second time;
    receiving seismic signals from said second activation of said first seismic energy source at said at least one point within said geophysical survey;
    activating said second seismic energy source after a second selected time delay from said second activation of said first seismic energy source and while said seismic signals from said second activation of said first seismic energy source are being received;
    recording, as a function of time, the amplitudes of the seismic signals received at said at least one point within said geophysical survey for each activation of said first and second seismic energy source;
    summing the amplitudes of the received seismic signals from each activation as a function of time;
    utilizing said selected time delays to time shift the received seismic signals from each activation so that the signals received from said second source are received at the same times for each activation;
    summing the amplitudes of said time shifted seismic signals as a function of time;
    utilizing said selected time delays to derive an appropriate time domain operator for each summation;
    deriving the Fourier transform to the frequency domain of each time domain operator;
    deriving the Fourier transform to the frequency domain of each summation;
    calculating the signals received from each seismic energy source in the frequency domain for each frequency; and
    deriving the inverse Fourier transform to the time domain of the signals received from each seismic energy source.

7. A method of obtaining seismic data for a geophysical survey according to claim 6 wherein said first and second seismic energy sources are surface energy sources.

8. A method of obtaining seismic data for geophysical survey according to claim 6 wherein said second selected time delay comprises a non-integral multiple of the period of said selected frequency component.

9. A method of obtaining seismic data for geophysical survey according to claim 6 wherein said first selected time delay comprises not less than one-quarter and not more that three-quarters of the period of said selected frequency component.

10. A method of obtaining seismic data for geophysical survey according to claim 6 wherein the step of recording the amplitudes of the seismic signals received at said at least one point within said geophysical survey comprises digitally recording said amplitudes.

* * * * *

UNITED STATES PATENT AND TRADEMARK OFFICE
CERTIFICATE OF CORRECTION

PATENT NO. : 4,953,657

DATED : September 4, 1990

INVENTOR(S) : Bruce L. Eddington

It is certified that error appears in the above-identified patent and that said Letters Patent is hereby corrected as shown below:

In Column 4, Line 21, the word "any" should read --many--

Signed and Sealed this

Twenty-third Day of June, 1992

Attest:

DOUGLAS B. COMER

*Attesting Officer*    *Acting Commissioner of Patents and Trademarks*